C. W. SHEELER.
AUTOMATIC COUPLING FOR AIR PIPES.
APPLICATION FILED JUNE 9, 1908.
906,570.
Patented Dec. 15, 1908.
2 SHEETS—SHEET 2.
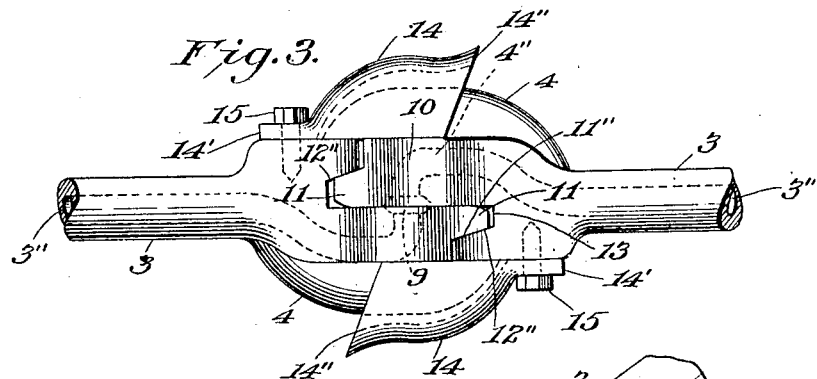
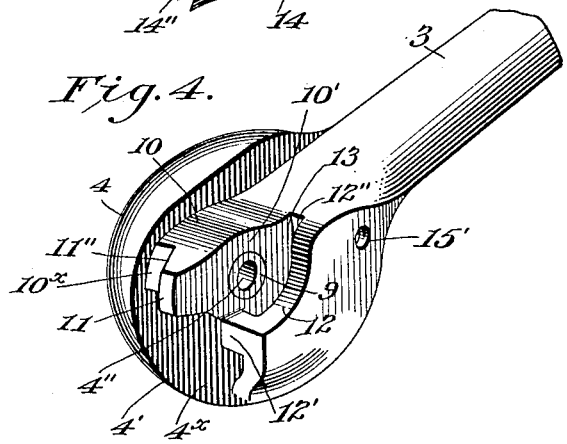
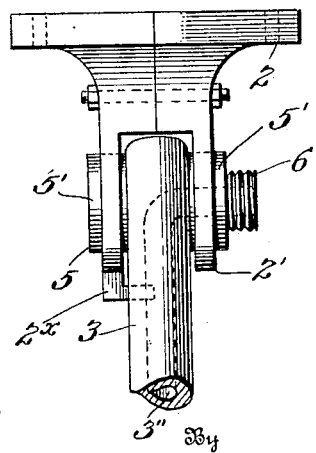
Witnesses
Inventor
Clarence W. Sheeler
By Joshua R. H. Potts
Attorney

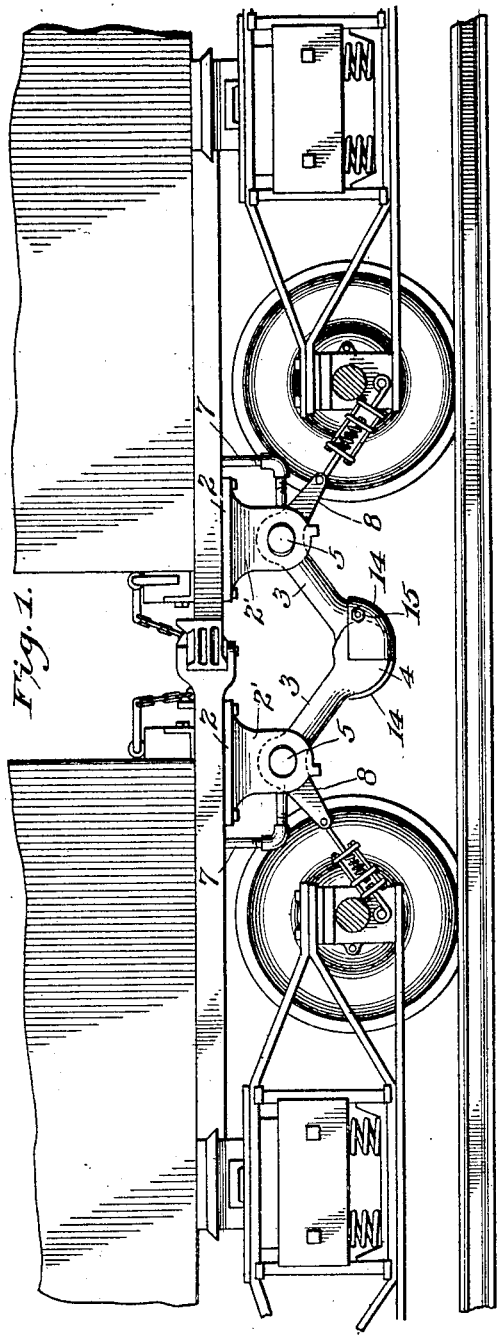

UNITED STATES PATENT OFFICE.

CLARENCE W. SHEELER, OF COATESVILLE, PENNSYLVANIA.

AUTOMATIC COUPLING FOR AIR-PIPES.

No. 906,570.  Specification of Letters Patent.  Patented Dec. 15, 1908.

Application filed June 9, 1908. Serial No. 437,475.

*To all whom it may concern:*

Be it known that I, CLARENCE W. SHEELER, a citizen of the United States, residing at Coatesville, in the county of Chester and State of Pennsylvania, have invented certain new and useful Improvements in Automatic Couplings for Air-Pipes, of which the following is a specification.

My invention relates to improvements in automatic couplings, and particularly to couplings for the pipe system of trains, the object of the invention being to provide a means whereby the steam, air or water pipes of a train may be automatically coupled without the necessity of the coupling being manually operated.

Minor objects of the invention are to provide means whereby the coupling heads shall be held closely engaged with each other, and whereby the said heads shall be held up in such position that they will engage with the coupling head and arm of the opposite car even where there is a difference in level between the two cars.

To this end my invention consists in a hollow coupling pivotally supported on the end of a car bottom having resilient means whereby it is raised into such position as to be engaged by the coacting coupling of the adjacent car, said coupling head being so formed as to connect with said opposite coupling head to form a tight joint between the two.

In the drawings, Figure 1, is a side view of the ends of two cars provided with my train pipe couplings. Fig. 2, is an enlarged side view of two oppositely disposed couplings disconnected from each other, one of the couplings being partly in section. Fig. 3, is a top view of two engaged coupling heads. Fig. 4, is a fragmentary perspective of one of the coupling heads, and Fig. 5, is an enlarged detail showing the connection between the coupling arm and the train pipe.

The general features of my invention are as follows: Supported in brackets 2 on the ends of the cars beneath the bottom thereof are the tubular coupling arms 3 carrying coupling heads 4 at their lower ends, each coupling head being adapted to engage with the opposite interacting coupling head as will be later described.

As shown, particularly in Fig. 5, each coupling arm is connected at its rear end to a tubular or hollow transverse journal 5 which has a threaded connection at 6 to a train pipe 7. Projecting rearwardly from the tubular journal or shaft 5 is the arm 8 formed in one piece with the arm 3 and the journal 5 and connected by a compression spring to any suitable portion of the car so that the coupling arm shall be normally forced upward and outward into a position where it may be engaged by the opposite coupling when the cars come together.

In detail the construction of the coupling heads and their interaction is shown in Figs. 3 and 4. Each consists of a body 4 approximately one half of an oblate spheroid the outer surface of which is rounded as shown in Fig. 3, and the inner surface of which has a vertical face $4^\times$, projecting from which are the lugs and recessed portions whereby one head intermeshes or engages with the other. The forward edge of the head is also rounded as at 4' so as to have a rocking contact with the arm or head of the opposed coupling. The body of the head is hollow or formed with a passage 4'' shown in dotted lines Fig. 3, which is a continuation of the passage 3'' in the arm 3. This passage turns within the head and debouches at the transverse axial center of the head where it is surrounded by a packing ring or gasket 9. On its inside face the body is formed with a portion 10 projecting from the general plane of the face and having thereon the radially projecting tapered lug 11. The passage 4'' opens out on the inside face of this projecting portion 10. Spaced from the face 10' of the portion 10, is the arcuate lug 12 having the edge thereof curved concentrically to the opening 4''. The inner face of the lug 12 is inwardly inclined as shown at 12'', Fig. 3, to engage with the inclined outer face 11'' of the lug 11. On its outer surface the lug 12 gradually merges into the body of the head. At its forward end the arcuate lug is formed with a stop 12' which crosses the recess 13 and against the upper edge of which the lug 11 of the opposite head will contact and be guided. The rear wall of the recess 13 is also concentric with the opening 4''. It is to be noticed in this connection that the edge $10^\times$ of the portion 10 between the lug 11 and the face $4^\times$ of the head is rounded so that it will bear nicely against the inwardly curved edge of the lug 12 of the opposed coupling head. It is also to be noticed that the lug 11 is narrowed towards its forward end as well as being laterally wedge shaped, and that thus it is easily guided into the recess 13 between the lug 12 and the face 10' of the opposed head and has freedom of play in said recess around the common axis of the two heads which is coincident with the opening 4''. Of course, it is to be understood that the body of the head with its lugs 11 and 12 is to be made in one piece, and preferably in one piece with the tubular arm 3. Both heads are precisely alike in constructon, and hence the description of one applies equally well to the other. One head however is reversely arranged to the other, that is for instance, the lug 11'' and the recess 13 are on the left hand side of one head, and on the right hand side of the other head.

In order that opposite heads may be guided into engagement with each other, I provide on each head a shield 14 of a general concavo-convex character, the rear edge of the shield being attached to the rear margin of the face of the head by a bolt 15 which screws into a recess 15' formed in the rear margin of the head, and the forward edge being slightly flared outwardly as at 14''.

As will be seen in Fig. 3, the shield projects outward from its flange 14' and then forward and is so shaped as to engage over the rounded portion 4' of the opposite head and to fit fairly closely thereon. This shield is not only for the purpose of guiding the heads into engagement with each other, but also acts to prevent the escape of steam or air past the contacting surfaces of the heads, and thus acts to make a closer joint between the two couplers. It will also be noted that the opposed wedge shaped lugs 11 engaging in the opposed wedge shaped recesses 13 tend to force the two heads into lateral engagement with each other so that the gasket 9 of one head will be pressed firmly against the gasket of the opposite head, thus compelling a tight joint between the two contacting surfaces of the heads. This is also aided by the contracted rear portion of the shields 14. It is also to be noted that because of the wedge shaped character of the projections and recesses on the heads, and the wedge shaped character of the opening between the shield and the head to which it is attached, that the engagement of one head with another is comparatively easy and that the coupling heads are forced automatically together.

As shown in Figs. 2 and 5, the brackets 2 are provided with downwardly extending lugs 2' formed with the ellipsoidal bearings 2'' in which the hollow journal 5 is supported. These bearings 2'' may of course be enlarged along their longer axes any degree required, the purpose being to allow a lateral play of the arm 3 and the attached coupling head, so that the couplings may not only be free to adjust themselves to each other, but may also be free to swing laterally as the cars pass around curves. Formed in one picee with the arm 3 and its journal 5 is the arm 8, which extends downwardly and rearwardly and carries at its end the pivoted rod 16. 17 designates a yoke having two lateral rods 17' and the cross bars 18', 18'', 18'''. The cross bar 18'' is slidable upon the rods 17'. The bar 16 passes through the cross bars 18', 18'', and is provided at its extremity with a nut 16'. Between the cross bar 18'' and 18' is located the spring 19 which normally pushes outward on the cross bar 18'' drawing upon the rod 16 and holding the coupler in the position shown in Fig. 2. To the cross bar 18''' of the yoke is attached the hook 20 which engages with any suitable projection or attaching means on the car. I have shown it as attached to a pin projecting from the truck, but it is of course to be understood that I do not wish to limit myself to this in any way. The journal 5 is formed in any suitable manner, but I have shown it as a tube closed at one end transverse to the tubular arm 3 and formed in part therewith having the bearing portions 5' which are supported within the lugs 2'. At its end it is reduced and is provided with screw threads whereby it may be attached either to a fixed pipe 7 or to the ordinary rubber hose pipe usually used on cars. In Fig. 1, I have shown the couplings as enlarged in order to show them more clearly.

In operation the coupling arms are supported in the position shown in Fig. 2, and upon cars of a uniform height and where the springs 19 are of a uniform elasticity, the coupling heads will be supported opposite to each other and will engage with each other as they come together. This engagement tends to force the opposite arms 3 downward contracting the springs 19. The two heads move against each other or against an opposed arm 3 with a sliding contact until the lugs 11 on both heads enter the recesses 13 of the heads. By reason of the rounded edge face 4' of the heads, the head will have a rolling as well as a sliding contact on an opposed arm 3, or against an opposed head. Immediately upon this occurring the wedge like sides of the lugs 11 and of the recesses 13 will force the two heads laterally against each other and into concentricity with each other, the two gaskets 9 contacting on their outer faces, thus forming a tight joint. As stated, the arms and heads are resiliently supported in the position shown in Fig. 2, when not connected. When the two members of the coupling contact with each other, or when the cars move nearer to each other, the two arms 3 form an acute angle with each other, and they may remain at this acute angle until the cars move away from each other when the angle will become more obtuse or that shown in Fig. 1. It will be understood of course that the angle between the arms will vary with the nearness of the cars, or their different relative heights, or the position of the brackets 2. As the two cars are constantly moving nearer or further from each other, the heads are so made as to allow them to rotate on a common axis relatively to each other and yet keep the openings 4″ in constant alinement. Even if the cars are of different heights within certain limits the coupling heads will engage for the reason that the two coupling arms after the couplings have contacted will move downward, one head sliding upon the other arm until the two heads are in engagement. This is due to the fact that the heads are not supported by arms or arm extensions which project horizontally towards each other, but that both arms are inclined downwardly, thus one arm is bound to contact with the head of the other coupling no matter at what angle the other arm may be, and no matter though the head of one coupling be supported above or below the head of the other coupling. They simply move together sliding against each other and turning on the bearings until the two couplings are engaged. This is a very important point as it provides for an absolutely positive engagement without the necessity of any manual operation in order to connect the couplings. In order that the coupling arms may not be forced back too far, I provide a stop $2^\times$ formed on the bottom of one of the ears 2′, this stop being turned at right angles beneath the ear and extending into the path of movement of the arm 3, thus the arm 3 cannot be forced backward beyond the stop $2^\times$.

The advantages of my invention lie in the ease with which the coupling heads adjust themselves upon each other until they eventually engage, in the close engagement of the heads with each other whereby the gaskets at the entrance of the openings 4″ contact to a degree sufficient to prevent the escape of fluid past the contacting faces, in supporting the opposite arms of the coupling heads by springs whereby they are held upward in position wherein they are obliged to contact with each other and slide upon each other until they are engaged, and in the extreme simplicity of the mechanism whereby this is accomplished. It will also be seen that there are no projecting guide fingers or like delicate parts to be broken, and that even if by any chance a lug 11 was broken on one head, yet the lug on the opposite head would hold the parts engaged.

Having thus described my invention what I claim as new and desire to secure by Letters Patent is:

1. An automatic coupling for train pipes having straight arms extending downward at an angle to the bottom of the cars towards each other and in the same vertical plane, the ends of said arms being enlarged to form coupling heads, the upper faces of each head and its connected arm gradually merging into each other whereby said opposed heads and arms are adapted to contact with and mutually slide upon each other until the heads meet and become inter-engaged.

2. An automatic coupling for train pipes having straight arms extending downward at an angle to the bottom of the cars towards each other and in the same vertical plane, and inter-engaging coupling heads connected with the train pipe system carried directly on the ends of said arms and in line with the longitudinal axis thereof, the upper faces of each of said heads and arms gradually merging into each other, each of said arms provided with an extension projecting rearward of the pivotal point of the coupling, and a spring connected thereto for holding the said coupling arm and its attached head outward in position to engage with the opposed arm or coupling head.

3. An automatic coupling for train pipes having straight arms pivoted at their rear ends upon adjacent cars and extending downward towards each other at an angle and in the same vertical plane, a coupling head formed on the end of each of said arms and in line with the longitudinal axis thereof, the upper faces of said head and arm gradually merging into each other, and springs for drawing said arms upward and forward, each of said heads being provided with a wedge shaped vertical recess and a wedge shaped projecting lug, the lug on one head being adapted to enter the recess on the opposed head, each of said heads having transverse centrally opening passages connected with the train pipe system and adapted to aline with each other.

4. An automatic coupling for train pipes consisting of oppositely disposed heads mounted upon downwardly inclined pivoted tubular arms, said arms having connection to the train pipe system, each of said heads approximating a semi-spheroid and having a passage therein communicating with the tubular arm and opening at the center of the other face of the head, each head having a lug projecting therefrom, and a recess formed therein adapted to engage with the lug and recess of the opposed head and to force said heads into contact with each other.

5. An automatic coupling for train pipes including downwardly inclined pivoted coupling arms, means for resiliently holding said arms into coupling position, coupling heads formed on the ends of said arms, the upper faces of each coupling head and arm merging into each other, means on each head for engaging the other, and each having a relatively rounded outer edge adapted to have rocking contact with the other head or with the opposed coupling arm and to be guided and moved along the same until the heads are in engagement.

6. An automatic coupling for train pipes including downwardly inclined pivoted tubular coupling arms, means for resiliently holding said arms in their coupling position, and coupling heads formed on the ends of said arms, each of said heads having a flat inner face, a portion raised therefrom having a radially projecting lug spaced from but parallel to the face of the head, and an arcuate lug inwardly spaced from the face of said raised portion, said head having a passage therethrough opening at the center of the raised portion and a recess between the arcuate lug and the face of the raised portion, said recess being arcuate, the recess and the arcuate lug being both concentric with the said opening.

7. An automatic coupling for train pipes including downwardly inclined pivoted tubular coupling arms, means for resiliently holding said arms in their coupling position, and coupling heads formed on the ends of said arms, each of said heads having a flat inner face, a portion raised therefrom having a radially projecting lug spaced from but parallel to the plane of the face, said lug having an inclined inner face, and an arcuate lug inwardly spaced therefrom and having an inclined inner face, said head having a passage therethrough opening at the center of the raised portion, and an arcuate recess between the arcuate lug and the face of the raised portion, said recess and said lug being concentric with the said opening.

8. An automatic coupling for train pipes including downwardly inclined pivoted tubular coupling arms, means for resiliently holding said arms into coupling position, and coupling heads formed on the ends of said arms, each of said heads having a vertical inner face adapted to contact with the vertical inner face of the opposed head, vertically extending lugs and recesses formed on said inner face of each head adapted to engage with the vertically extending lugs and recesses of the opposed head, and a shield attached at its rear edge to the rear edge of each of said heads adapted to engage over the side of the opposed head when the two heads are in engagement.

9. An automatic coupling for train pipes including downwardly inclined pivoted tubular coupling arms, means for resiliently holding said arms into coupling position, and coupling heads formed on the ends of said arms, each of said heads having a flat inner face, a portion raised therefrom having a radially projecting lug, and an arcuate lug inwardly spaced therefrom and forming one wall of an arcuate recess adapted to receive the lug of the opposite head, said head having a passage therethrough opening at the center of the raised portion, each of said heads being provided on its inner faces with an outwardly and forwardly projecting vertically curved guiding shield adapted to fit over and contact with the outer surface of the opposed head when the heads are in engagement with each other.

10. An automatic coupling including downwardly inclined tubular coupling arms, means for resiliently holding said arms into coupling position, coupling heads formed on the heads of said arms adapted to engage with each other, a hollow journal at the upper end of each arm into which the tubular arm opens, said journal having means of connecting it with a train pipe, and brackets for said journal, each having a horizontally elongated bearing therein in which the journal is mounted.

11. An automatic coupling including downwardly inclined tubular coupling arms, coupling heads formed on the ends of said arms adapted to engage with each other, a hollow journal at the upper end of each arm connected to the train pipe system, bearings in which the journal is mounted, an arm projecting out from the journal opposed in direction to the tubular arm, and a spring connected to said arm for holding it and the head in coupling position.

12. An automatic coupling including downwardly inclined tubular coupling arms, coupling heads formed on the ends of said arms adapted to engage with each other, a hollow journal at the upper end of each arm connected to the train pipe system, bearings in which the journal is mounted, an arm projecting out from the journal opposed in direction to the tubular arm, a yoke having a cross bar at one end and at the other means for attaching it to the car frame, and a spring surrounding the pivoted arm and located between the end of said arm and the cross bar of the yoke to resist movement of the arm in an upward direction.

13. An automatic coupling for train pipes including downwardly inclined pivoted tubular coupling arms having a tubular journal formed on the upper end thereof provided with means for connection to a train pipe system, bearings in which said journal is mounted, a downward extension formed on said tubular arm and opposed in direction thereto, a spring connected to said downward extension for holding the tubular arm in its coupling position and coupling heads formed on the ends of said tubular arms, each of said heads having a rounded outer face and a relatively flat inner face, a portion raised therefrom having a radially projecting lug spaced from but parallel to the face, said lug having an inclined inner face, and an arcuate lug inwardly spaced from said radially projecting lug forming the outer wall of an arcuate recess, said head having a passage therethrough opening at the center of the raised portion and adapted to aline with a passage in the opposed coupling head, the said arcuate recess and lug being concentric with the said opening.

In testimony whereof I have signed my name to this specification in the presence of two subscribing witnesses.

CLARENCE W. SHEELER.

Witnesses:
FREDERIC B. WRIGHT,
M. C. LYDDANE.